March 24, 1931.  F. B. LENTZ  1,798,022
WINDOW CLEANER'S SEAT
Filed Oct. 19, 1929   2 Sheets-Sheet 1

FRED BERNARD LENTZ, INVENTOR
BY Victor J. Evans, ATTORNEY

WITNESS M. Ford.

March 24, 1931.  F. B. LENTZ  1,798,022
WINDOW CLEANER'S SEAT
Filed Oct. 19, 1929  2 Sheets-Sheet 2
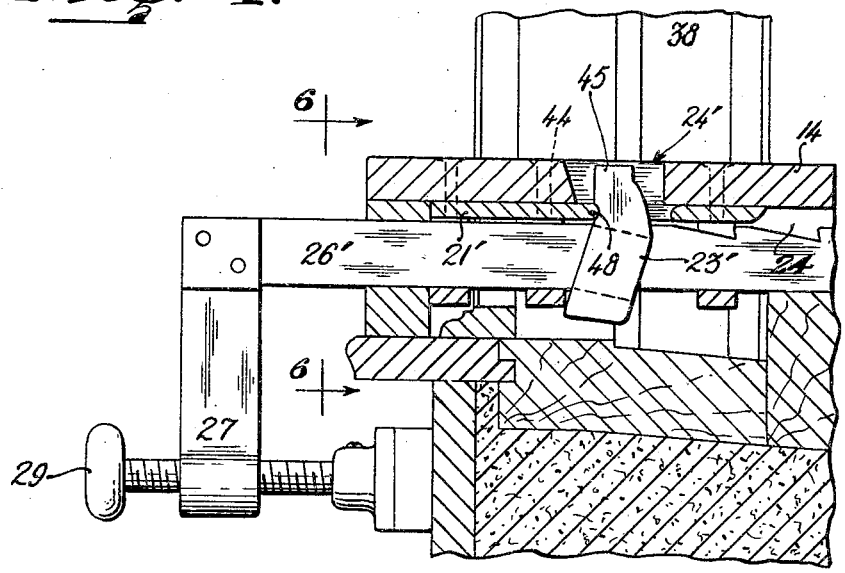
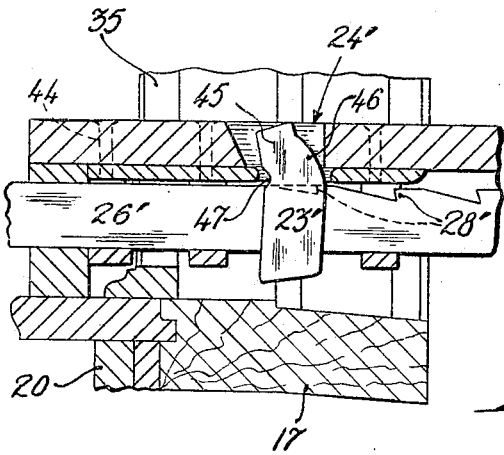
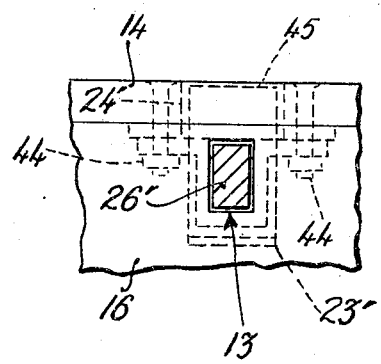
Fred Bernard Lentz, INVENTOR
BY Victor J. Evans, ATTORNEY Patented Mar. 24, 1931  1,798,022

UNITED STATES PATENT OFFICE

FRED BERNARD LENTZ, OF BRONX, NEW YORK

WINDOW-CLEANER'S SEAT

Application filed October 19, 1929. Serial No. 400,916.

This invention relates to window seats and has particular reference to a removable seat for a window cleaner.

The primary object of the invention is the provision of a window seat part of which is capable of being securely mounted, by a window cleaner or other person, on the inner side of a window structure, while the person remains within the building; and the other part of which affords a strong and rigid support outside of the structure, so that the cleaner may use the device with complete safety while cleaning the outer side of the window.

Another object of the invention is the provision of a support for a window cleaner, which, while provided with a seat base and a back for accommodating one who cleans windows in a residence or like building, is also suitable for use in a business structure, where the window cleaner, who has heretofore used a safety belt or harness, the latter being removably attached to the outer wall of the building, necessarily performs the cleaning operation while standing outside. In the latter case the seat may form a footing while the seat back acts as body-guard or hand rail, the harness being dispensed with.

A further object of the invention is to provide a window seat of the class described which may be conveniently moved from place to place by one person, and which may also be readily attached to or removed from a window without the use of tools.

A feature of the invention is a manipulable clamping device, to be hereinafter fully explained, which is adapted for rigid threaded engagement beneath fixed parts of existing windows.

Other objects and advantages of the invention will be hereinafter specifically pointed out, or will become apparent, as the specification proceeds.

With the above indicated objects in view, the invention resides in certain novel construction and combination and arrangement of parts, clearly described in the following specification and fully illustrated in the accompanying drawing, which latter shows an embodiment of the invention as at present preferred.

Fig. 4 is a fragmentary vertical sectional view, like that illustrated in Figure 2, but showing a modification of structure on an enlarged scale.

Fig. 5 is a like view, but showing some of the parts in different positions.

Fig. 6 is a view on the line 6—6 of Figure 4.

Figure 1:
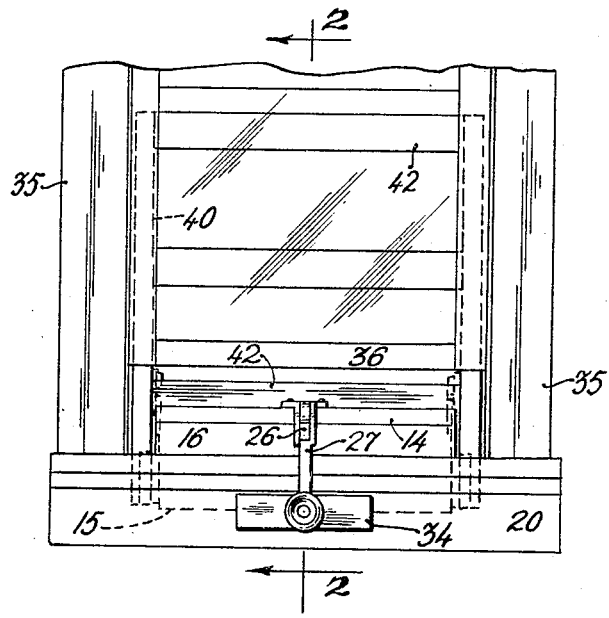
Fig. 1 is a partial front elevational view of a window having my approved seating device attached thereto.
Figure 3:
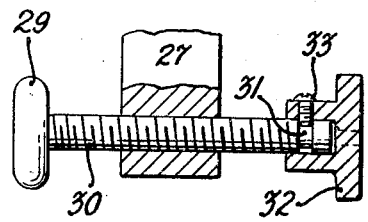
Fig. 3 is a side elevational view, partly in section, and including a manipulable hand wheel of an adjustable clamping element.
Figure 2:
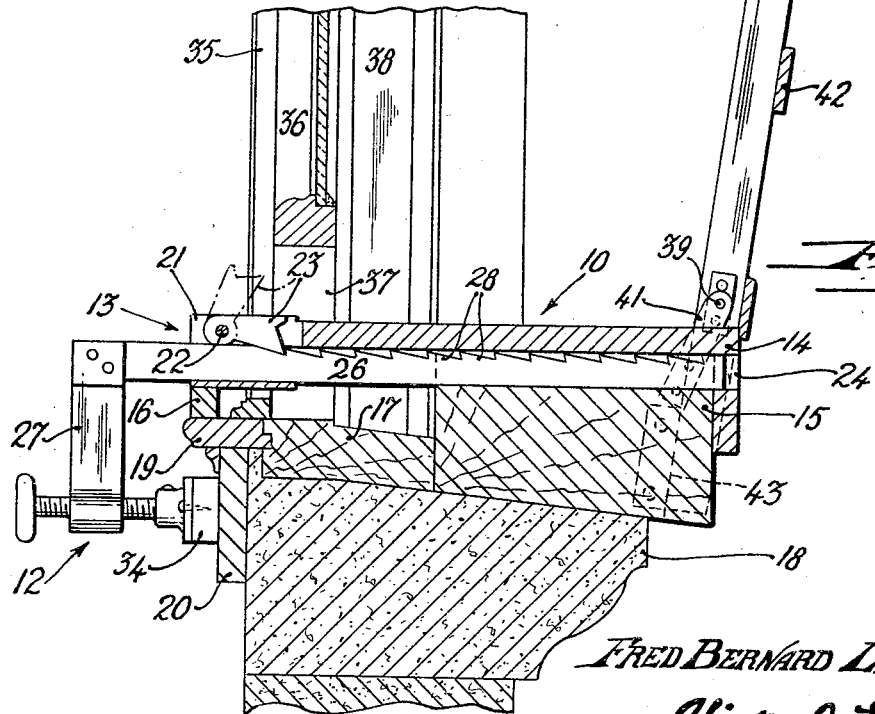
Fig. 2 is a vertical sectional view on the line 2—2 of Figure 1.

Referring particularly to the drawings by reference characters, the window seat, in the embodiment thereof selected for illustration, includes a base 10, having a hinged back 11 and a clamping unit 12, there being a slot 13 in said base for slidably receiving part of the clamping unit.

The base 10 comprises a horizontal seating member 14 which is rigidly secured to a rear support 15, while a support 16 is attached to the front of said base, the space between these supports being of any suitable dimension for freely receiving the usual fixed member 17 of a window sill. While the support 15 rests on another part 18 of the fixed structure, the support 16 finds a seat on the inner member 19, an additional part of the usual fixed structure being shown at 20.

Part of the slot 13 accommodates therein a housing 21 the side walls of which, attached to the member 14, carry a pin 22 on which a movable dog or pawl 23 finds a bearing, while in another part 24 of the said slot one arm 26 of the clamping unit, hereinbefore referred to, is slidably mounted, another arm 27 of the same unit being metallically attached, as by welding or rivets, to the first mentioned arm. The dog 23 is provided with a finger piece, as shown, which is appropriately accessible for moving the same into or out of engagement with teeth 28 of the arm 26.

Threadedly mounted in the arm 27 is a manipulable member which includes a hand wheel 29 and a threaded shank 30, the latter having an annular groove 31, positioned internally of the bearing 32, which receives a retaining screw 33; said bearing being fixedly carried on a bearing block 34. The dog 23 holding the arm 26 which is being adjustably fixed within the seat base 14, and the shank 30, by appropriate manipulation of the wheel 29, causes the support 15 to be clamped against the member 17, and at the same time pressure is exerted against the member 20 by the block 34, thereby securely attaching the window seat to the sill, said seat being, of course, removable on turning the wheel 19 in the opposite direction.

The lateral boundaries of the window seat are just less than the space between the fixed frames 35 of the window; and as the back 11 of the said seat is hinged to the support 15, and is swingable into contacting parallel relation with said member 14, the window seat is movable between said frames 35, on upward sliding movement of the sash 36, to open the window, for locating the window seat in the required position, there being runways 37, 38 in the window frames for the movable sashes.

The hinge means for back 11 includes a pair of pins 39 attached to the inner faces of the members 40, while a pair of plates 41, attached to the opposite ends of the support 15, are provided with apertures for receiving the said pins. The members 40 are held together by cross bars 42, while the back 11 is retained in a practically vertical position by stops 43 secured to the support 15.

While I have shown the member 30 of the clamping device 12 in a horizontal position, to suit the particular form of window sill illustrated, it is evident that the said member may also be disposed in a vertical or other position to accommodate a window sill of different construction.

In Fig. 4 I have shown a modification of structure, in which a plate 21' is attached by fastening elements 44 to the seat 14, while an opening 24', in register with an opening in said plate, communicates with the slot or groove 24. Carried on the bar 26', the teeth 28' of which are suitably formed, is a dog 23' or trip member the terminal 45 of which is positioned in the opening 24'. This latter member is provided with an inclined rear shoulder 46 and an opposite notch 47.

On moving the seat member 14 forwardly to locate the same in the required position, the dog 23' slides over the teeth 28', as indicated in Fig. 5, the said dog being free to drop automatically by its own weight, into the Fig. 4 position on passing each tooth 28'. In this latter position, on tightening the hand wheel 29 the edge 48 of the plate 21' engages in the notch 47 to positively lock the window seat to the window sill.

The hereinbefore described construction admits of considerable additional modification without departing from the invention; therefore, I do not wish to be limited to the precise arrangements shown and described, which are, as aforesaid, by way of illustration merely. In other words, the scope of protection contemplated is to be taken solely from the appended claims, interpreted as broadly as is consistent with the prior art.

What is claimed as new is:—

1. A seating device comprising a base having a slot therein, said base being adapted to be positioned on a window sill, a stop member carried by said base in said slot, a clamp for said base including an arm having teeth thereon, said stop being engageable with one of said teeth, and a manipulable element carried by said clamp and adapted for engagement with the window sill, whereby the latter is also held engaged with said base.

2. A seating device comprising a base having a fore- and aft slot therein, said base being adapted to be supported on a window sill, a pawl pivoted in said slot, clamping means for said base including a toothed arm, said arm being slidable in said slot, a depending arm rigid with said first arm, a bearing member adapted to be positioned on the window sill, and a manipulable element adjustably mounted in said pendant arm and finding a bearing in said member for attaching said base to the window sill, said pawl being engaged with one of the teeth of the slidable arm.

3. A window seat comprising a base having a fore- and aft slot therein, part of said base being adapted to be positioned against the outer side of a window sill, a pivoted pawl carried by said base in said slot, a seat back on the outer end of said base, clamping means for said base including a toothed arm slidably mounted in said slot below said pawl, a depending arm rigid with said slidable arm, a bearing member adapted to be positioned on the inner side of the window sill, and a manipulable element threadedly mounted in said latter arm and finding a bearing in said member, whereby one of the teeth of said first arm is rigidly engageable with said pawl for attaching the window seat to the window sill.

In testimony whereof I hereby affix my signature.

FRED BERNARD LENTZ.